United States Patent [19]

Vrooman

[11] 4,092,963

[45] June 6, 1978

[54] VAPORIZER-REGULATOR, LIQUID FUEL

[76] Inventor: Richard A. Vrooman, 22628-87th West, Edmonds, Wash. 98020

[21] Appl. No.: 771,638

[22] Filed: Feb. 24, 1977

[51] Int. Cl.² .......................................... F02M 31/00
[52] U.S. Cl. .............................. 123/133; 123/122 E; 123/122 F; 261/142; 261/69 R; 48/103
[58] Field of Search ................ 123/122 E, 133, 34 A, 123/122 F; 261/142, 69 R; 48/180 H, 103

[56] References Cited

U.S. PATENT DOCUMENTS

| 1,118,126 | 11/1914 | Harroun | 261/142 |
| 2,145,863 | 2/1939 | Curioni | 261/142 |
| 3,851,633 | 12/1974 | Shih | 123/133 |
| 4,050,419 | 9/1977 | Harpman | 123/133 |

FOREIGN PATENT DOCUMENTS

| 192,215 | 9/1936 | Switzerland | 123/133 |
| 203,634 | 6/1939 | Switzerland | 123/133 |

Primary Examiner—Ronald H. Lazarus

[57] ABSTRACT

A vaporizer-regulator device is which liquid fuel intended for use in an internal combustion engine is vaporized by an electrically energized heating element. The liquid fuel is contained in a reservoir in which a constant fuel level is maintained during operation by inlet and outlet floats. The outlet float senses a rise in fluid level, operating a contact switch, cutting the electrical current to the heating element, and opening a reservoir outlet drain. The inlet float senses a lowering of fuel level and causes fresh fuel to be injected into the reservoir. In this manner, heating element temperature and reservoir fluid level is controlled during engine operation. The liquid fuel is fed by hydrostatic pressure into a vaporizing chamber and brought into contact with the heating element. The dry fuel vapor thus produced is drawn through a two stage control valve into an expansion chamber. It is then drawn through a duct into an annular or spud-in nozzle, attached to a carburetor venturi mouth, mixing with air to form a combustable mixture. The two stage control valve displacement, correctly metering the dry fuel vapor into the expansion chamber, is caused by either a vacuum operated diaphragm or a throttle linkage controlled cam.

6 Claims, 9 Drawing Figures

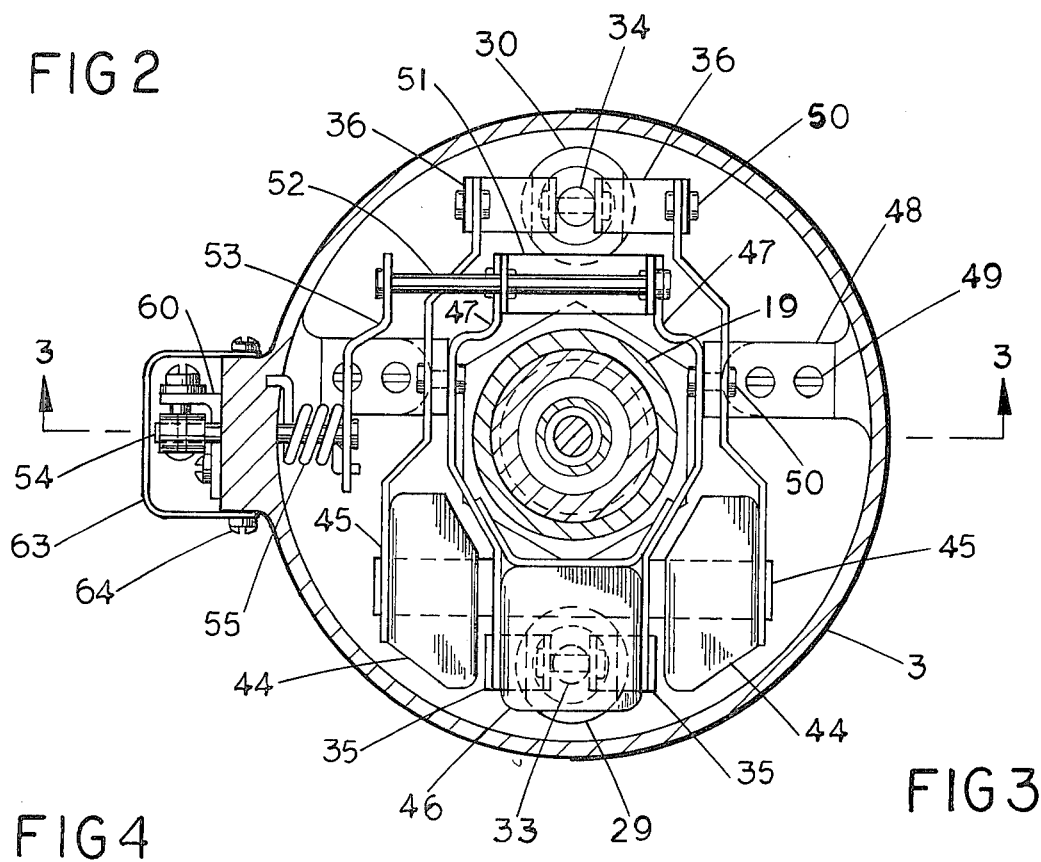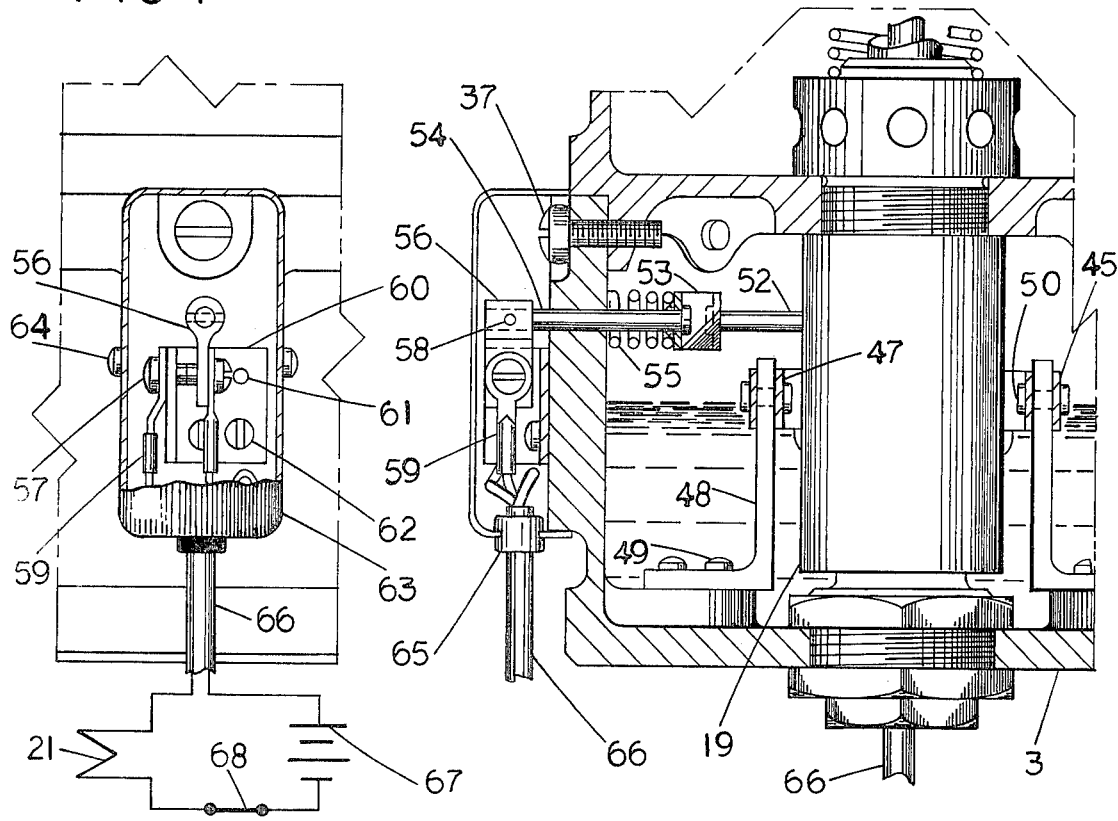

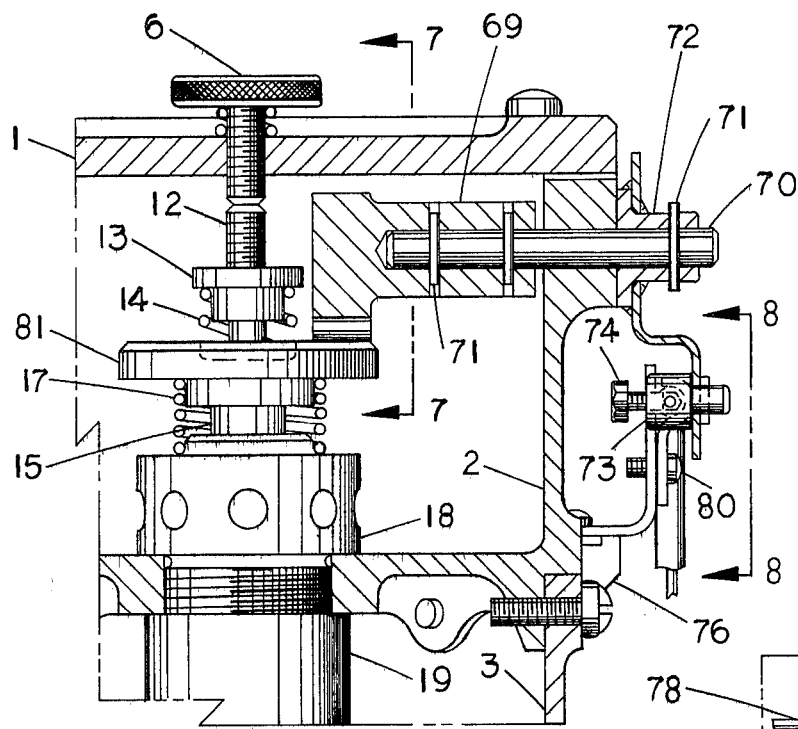

VAPORIZER-REGULATOR, LIQUID FUEL

This invention relates to a device, vaporizing a liquid fuel to a dry gas, regulating the specific quantity required to support combustion in an internal combustion engine, through a carburetor venturi mixing with air, to form a combustable mixture. The combustable mixture, reduced to molecular sized particles, is transported through the intake manifold and injected into the combustion chamber where complete, efficient burning is accomplished.

It is an object of the invention to provide a safe, simple, reliable mechanism to vaporize liquid fuel into a dry gas. It is a further object of the invention to accurately meter the gasified fuel produced by this device through a venturi adapter to convert a liquid fuel carburetor to one utilizing gaseous fuel vapor, greatly increasing combustion efficiency without altering or interferring with any attached air pollution devices, at minimum installation cost. It is an object of the invention to vaporize various liquid fuels to a gaseous state providing a multi-fuel operational capability for mobile or stationary powerplants utilizing this device.

This invention features a cylindrical container divided into two chambers, the liquid fuel reservoir and the vapor expansion chamber. A duct connecting the two chambers together contains an electrically energized heating element means to produce fuel vapor. The fuel vapor is metered through a two stage control valve in the duct upper end into the vapor expansion chamber. The two stage valve provides for low and high speed engine operation, and is actuated by an intake manifold vacuum operated diaphram or a cam connected to the throttle linkage. The vaporized fuel is passed through a hose connected to an annular nozzle mounted to a liquid fuel carburetor throat. The combustable mixture thus formed, a uniform mixture of air and fuel molecules, is injected into the combustion chamber and efficiently burned. A fuel vapor control valve limits vaporizer output flow to match the carburetor intake flow at maximum throttle setting. The advantages of this device is to achieve a "super-efficient" carburetor. Inventors have been striving to perfect such a device for many years, and the current critical fuel shortage has stimulated much recent activity in this endevor. The majority of these carburetor concepts utilize vaporized fuel to increase efficiency. In a conventional carburetor, liquid fuel is mixed with incomming air and flows to the combustion chamber as a wet mist through the intake manifold. A large percentage of the fuel droplets coat the intake manifold or combustion chamber walls or are blown into the exhaust manifold due to intake-exhaust overlap. The combustion reaction takes place when a molecule of oxygen links with a similar molecule of fuel by a coupling of the outer valence rings. This can only be accomplished when the fuel and oxidizer have been vaporized to a dry gas. A liquid fuel droplet can only vaporize on the interfacing surface with the oxidizer. Consequently, the fuel inside the droplet is not vaporized and not in contact with the oxidizer and cannot possibly burn. Energy release is greatly restricted but due to the surplus liquid fuel, high temperatures are induced. In this high temperature environment, the wasted liquid fuel forms the nitrous oxides and hydrocarbon waste products that cause air pollution. By vaporizing the liquid fuel, mixing takes place in the intake manifold, permitting instantaneous, efficient ignition in the combustion chamber. A carburetor patented by Charles Nelson Pogue in 1931, reference: U.S. Pat. No. 1,809,531, was constructed and produced remarkable efficiencies and thus demonstrated the validity of the above theory. However, the mechanism was too complex and costly for mass production. Modern inventors have had the same problem as the recent devices are cumbersome, dangerous, and too complex for mass production. Natural gas carburetors and vaporizer-regulators, utilizing Liquid Petroleum Gas as fuel, have been used for years with safety and efficiency, demonstrating the feasibility of vaporizing liquid fuel. For automotive applications; the natural gas or other petroleum gasses are liquified under great pressure for storage, then expanded to a gas through a two stage regulator, and mixed with air in the carburetor venturi. Since gasoline, diesel oil, kerosene, alcohol, etc., are liquid at standard ambient conditions and require considerable heat of vaporization for gassification; LPG devices are not able to vaporize liquid fuels. The essence of the invention concept described in this document is to provide heat of vaporization by an electrically energized heating element, located in a small diameter duct connecting a float controlled liquid fuel reservoir to a vapor expansion chamber. The flow of liquid fuel vaporized is thus controlled to achieve maximum engine operating efficiency. Hydrostatic pressure, due to the float controlled fluid depth in the reservoir, feeds fuel into the small diameter duct. A device is thus created that controls, meters, contains, and safely distributes gasified fuel to the carburetor. This invention is adaptable to different carburetor and engine configurations and is simple enough for economical mass production.

The design features of this invention along with the variations of the design and concept are set forth in the following description. The features of the present invention which are believed to be novel are set forth and described in the appended claims. The drawings included in this description may be referred to by the index numbers included below.

In the drawings:

FIG. 2 is a crossection along line 2—2 in FIG. 1, rotated 90° CCW, looking down through the lower housing fuel reservoir.

FIG. 3 is a partial section along line 3—3 in FIG. 2, illustrating the fuel reservoir side view.

FIG. 4 is a direct projection off the left hand side of FIG. 3, illustrating the contact switch installation.

FIG. 5 is a partial section through the centerline of the invention, 90° to the FIG. 1 cutting plane, illustrating the cam operated high speed valve embodimet of this invention.

FIG. 6 is a direct partial projection off the right side of FIG. 5, illustrating a side view of the cam shaft lever arm.

FIG. 7 is a partial crossection along line 7—7 in FIG. 1, illustrating the cam profile and cam follower.

FIG. 8 is a partial view along line 8—8 in FIG. 1, illustrating the cam linkage attachment mode.

FIG. 9 is a schematic diagram illustrating the liquid fuel vaporizer-regulator installation and operation.

Figure 1:
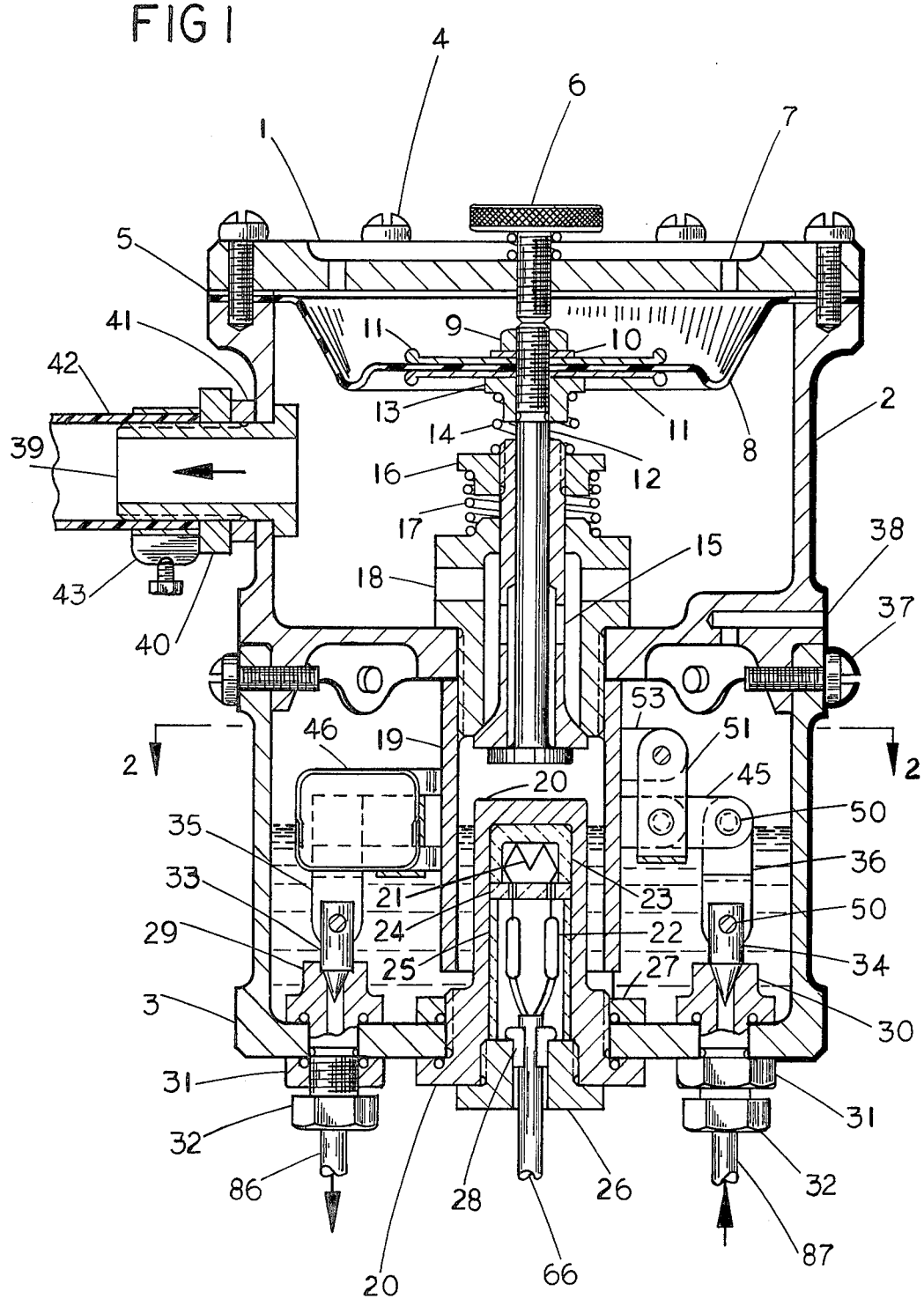
FIG. 1 is a full section through the centerline of the invention, looking toward the contact switch side, illustrating the diaphram operated high speed valve embodiment of the invention.

Referring to the drawings in detail, all linkage and components are illustrated at zero clearance and displacement. In FIG. 1, this invention is constructed as a two chamber cylindrical container, with an upper housing cover 1, upper housing 2, and lower housing 3. The upper housing cover 1, a cast or machined circular flat plate, is attached to the upper housing 2 by the cover screws 4, and sealed by cover gasket 5. The upper housing 2 is attached to the lower housing 3 by means of the housing interface screws 37, forming a structurally integral and sealed container, except for the required inlet and outlet apatures. These items, circular in crossection, are fabricated as castings or machinings and provided with a suitable corrosion resistant coating. The annular cover gasket 5 is fabricated from a petroleum resistant rubber or plastic material and provides an air tight seal. The low speed adjusting screw and spring 6 is threaded through a hole in the upper housing cover 1 center and provides a mechanical stop, holding the low speed valve 12 open, providing engine idle fuel vapor to the upper housing 2. The space between the flexible diaphram 8 and the upper housing cover 1 is vented to atmospheric pressure by the two diaphram air vents 7. Consequently, the pressure drop across the flexible diaphram 8 is the difference between atmospheric and carburetor venturi vacuum pressures. The low speed valve 12 is forged, cast, or machined with a flange and stem. The low speed valve 12 threaded stem is attached to the flexible diaphram 8 with the diaphram nut 9, diaphram washer 10, and the low speed valve spring retainer 13. The diaphram thrust washers 11 and flexible diaphram 8 are trapped between these items, transmitting pressure loads induced on the flexible diaphram to the low speed valve 12. The flexible diaphram 8 will be fabricated from fuel resistant rubber or plastic; while the items 9, 10, 11, and 13 are fabricated from corrosion resistant metal. The low speed valve spring 14 preloads and returns the flexible diaphram 8 and the low speed valve 12 to zero deflection position, when engine operation terminates. The low speed valve spring 14, a standard commercial item, is attached between the low and high speed valve retainers 13 and 16. The low speed valve 12, assembled concentrically in the high speed valve and port assembly 15, will displace independently until the low and high speed valves spring retainers 13 and 16 contact. The high speed valve and port assembly 15, machined, cast or forged from corrosion resistant metal; is profiled with a flange and stem. A hole, drilled through the high speed valve stem upper half, slide fits to the low speed valve stem. A cavity with ports, machined in the high speed valve stem lower half, forms a chamber between the two valves. When the low speed valve 12 is displaced downward, fuel vapor flows into this chamber and out through the ports to the upper housing 2. The high speed valve spring retainer 16, threaded to the high speed valve and port assembly 15 stem end, transmits a force from the high speed valve spring 17, to the valve stem. The restoring force load, induced because the high speed valve spring 17 is trapped between the high speed valve spring retainer 16 and the valve housing and port assembly 18, returns the valve to zero displacement when engine operation terminates. The high speed valve spring 17 is much stiffer than the low speed valve spring 14, permitting low speed valve deflection without deflecting the high speed valve. The valve housing and port assembly 18, machined, cast, or forged from corrosion resistant metal, is profiled into a cylindrical shape with a smooth upper portion and a smaller diameter, threaded lower portion. A hole, drilled into the valve housing upper center, slide fits to the high speed valve and port assembly 15. A cavity with ports, machined in the lower valve housing center, forms a chamber between the valve and housing. When the high speed valve and port assembly 15 is displaced downward, this chamber is opened, permitting fuel vapor to flow through the valve housing ports into the upper housing 2. The valve housing and port assembly 18 is threaded to the upper housing 2 and the vapor chamber housing 19, locking the entire assembly together. The vapor chamber housing 19, machined from corrosion resistant metal, is profiled into a tubular shape. Threads, machined into its upper inner surface, mate with the valve housing and port assembly 18, while the the remaining inner surface is smooth. The vapor chamber housing 19, open at the bottom, permits the heating element housing 20 to protrude inside, forming a vapor chamber between the valve housing and port assembly 18 and the upper heating element housing 20 surface. When the high or low speed valves are opened, fuel vapor flows directly into the upper housing 2. The constricted space between the heating element housing 20 and the vapor chamber housing 19 limits the flow of liquid fuel being vaporized. The heating element housing 20, machined, cast, or forged from corrosion resistant metal, is profiled to a cylindrical shape with a smooth upper portion and a larger diameter, threaded lower body. An hex nut profile, machined in the threaded body end, provides a means of attaching the heating element housing 20, from outside to inside, to the lower housing 3. A constant diameter inner chamber contains the heating element 21; the electrical connectors 22; the ceramic insulators 23, 24, and 25; the split grommet 28; and the heating element conductor wire 66. The heating element 21 is of sufficient wattage to provide heat of vaporization to the liquid fuel, and is insulated from the heating element housing 20 by the ceramic insulator cap 23 and the ceramic insulator disk 24. The heating element leads, routed through the ceramic insulator disk 24, are attached to the heating element conductor wire 66 by the electrical connectors 22. The ceramic insulator spacer 25 provides further insulation and functions as a spacer between the ceramic insulator disk 24 and the heating element housing retaining nut 26. The heating element housing retaining nut 26 locks into place the ceramic insulators, and with the split grommet 28, seals the inner heating element housing from moisture or dirt contamination. "O"-ring seals, located in the heating element housing hex head end and the heating element housing nut 27, locks and seals the heating element housing 20 to the lower housing 3, preventing leakage from the liquid fuel reservoir. The identical outlet and inlet fittings 29 and 30, machined cylindrical in profile from corrosion resistant metal with a threaded body and larger diameter shoulder flange with integral "O"-ring seals, thread into and through the lower housing 3, providing an attaching means for the fitting and tubing nuts 31 and 32. The fitting nut 31, with an integral "O"-ring seal, locks and seals the outlet and inlet fittings 29 and 30 to the lower housing 3. Standard fuel line tubing is attached to the outlet and inlet fittings with the tubing nut 32. The outlet valve plug 33, pinned to the outlet valve plug linkage 35, mates with the outlet fitting 29, to drain surplus liquid fuel from the lower housing 3. The outlet valve plug 33 is profiled with a cylindrical body and conical point from corrosion resistant metal. A shoulder, machined in the outlet fitting 29, permits outlet valve plug 33 vertical displacement before fuel can drain through the fitting orifice. This initial vertical displacement operates the electrical switch linkage 51, which is fixed to the outlet float 46. The inlet valve plug 34, pinned to the inlet valve plug linkage 36, mates with the inlet fitting 30, to control fresh liquid fuel flow to the lower housing 3. The inlet valve plug 34, machined from corrosion resistant metal, is profiled similar to the outlet valve plug 33. The inlet fitting 30 is contoured to permit fuel to flow into the lower housing 3 at the initial displacement of the inlet valve plug linkage 36, which is pinned to the inlet float linkage 45. The float linkage pivot pin 50 is used for all linkage joints requiring rotational freedom. The lower housing 3, as shown in FIG. 1, vented to atmospheric pressure by means of the fuel reservoir air vent 38, creating a pressure differential between the fuel reservoir and the inner vapor chamber housing 19. Hot, dry fuel vapor exits from the upper housing 2 through the fuel vapor outlet fitting 39. The fuel vapor outlet fitting 39, machined from corrosion resistant metal, is profiled cylindrically with a flange and a smaller diameter threaded body, which protrudes through the upper housing 2 side. The fuel vapor outlet fitting 39 is locked and sealed to the upper housing 2 with the fuel vapor outlet fitting nut 40 and adapter washer 41. The fitting flange and the adapter washer are profiled to fit the upper housing radiused surface. The fuel vapor hose 42 is clamped to the fuel vapor outlet fitting 39 threaded body, extending beyond the fuel vapor outlet fitting nut 40, with the fuel vapor hose clamp 43. The fuel vapor hose 42 attaching means to the liquid fuel carburetor 95 will be included in the system installation and operation discussion associated with FIG. 9.

Referring to FIGS. 2, 3, and 4; the fuel reservoir and its control mechanism is illustrated. In FIG. 2, the outlet and inlet fittings 29 and 30, located toward the lower housing 3 outer edge, permits linkage to be placed around the vapor chamber housing 19. Each fitting has its own independent float, linkage, and valve plug mechanism designed to maintain the fluid level; indicated by the shading in FIGS. 1 and 3; under all operating conditions. The inlet valve plug 34 is pinned to the inlet valve plug linkage 36, which is pinned to the inlet float linkage 45, which is fixed to the inlet float 44. The outlet valve plug 33 is pinned to the outlet valve plug linkage 35, which is fixed to the outlet float linkage 47, which is fixed to the outlet float 46. The floats and linkages are fabricated from corrosion resistant metal flat stock. The single outlet float 46, is placed between two outboard floats, assembled together with the inlet float linkage 45, forming the inlet float 44. Both sets of linkages are pinned at a common pivot point, drilled in each of two float linkage support brackets 48, with the float linkage pivot pin 50. The inlet float and its linkage can only rotate downward as fluid level drops; and the outlet float and its linkage can only rotate upward, as fluid level rises in the fuel reservoir. The float linkage support bracket 48, fabricated from a standard angle section, is attached to the lower housing 3 floor by the support bracket screw 49. The horseshoe shaped electrical switch linkage 51 is pinned to the outlet float linkage 47 end with the horseshoe legs pointing upward; where the electrical switch connecting pin 52 is attached, refer to FIG. 1. The electrical switch connecting pin 52 opposite end, pinned to the electrical switch lever arm 53, transmits downward forces induced by the fluid level rising in the fuel reservoir. The electrical switch lever arm 53 is welded to the electrical switch shaft 54, transmitting torque, and is spring loaded by the electrical switch shaft spring 55, seating the outlet valve plug 33 in the outlet fitting 29 orifice. The electrical switch shaft extends through a hole in the in the lower housing 3 side to the exterior, where the electrical switch contact arm 56 is attached. In FIG. 3; the electrical switch shaft 54, located well above the fluid level as indicated by the shaded surface, is slide fit to the lower housing 3, with tight hole tolerances preventing vapor leakage. Since the contact point screws 57 will arc during operation, a vapor leak could cause an explosion. A boss, protruding from the lower housing 3 surface, permitts the electrical switch cover 63 attachment by cover screw 64. The heating element conductor wire 66 is sealed through the electrical switch cover 63 by the cover grommet 65. Due to its close proximity to the electrical switch cover, the housing interface screw 37 is enclosed under the cover. The electrical switch contact arm 56 is pinned to the electrical switch shaft 54 end with the contact arm roll pin 58. Referring to FIG. 4, illustrating the electrical switch cover 63 cut away to expose the electrical switch componnents; the contact arm 56, the contact point screws 57, the attaching leads 59, and the angle support 60. As the liquid fuel level in the lower housing 3 fuel reservoir rises, the electrical switch contact arm 56 rotates counter-clockwise, separating the electrical switch contact point screws 57. The electrical switch contact arm 56 and support angle 60, fabricated from a nonconductive plastic, contain threaded inserts to attach the contact point screws 57. The electrical switch support angle 60, aligned by the angle support pin 61, is attached by the angle support screws 62 to the lower housing 3. The electrical switch shaft 54 is fabricated from corrosion resistant metal. If possible, a commercially available contact switch will be substituted for the design illustrated in these figures. When the ignition switch 68 is closed, refer to the wiring diagram in FIG. 4, the heating element conducting wire 66 is attached to the electrical energy source 67 and the heating element 21. Consequently, when the contact point screws 57 are separated; the current to the heating element 21 is terminated. For an experimental unit, a reostat would be attached across the heating element terminals to determine optimum operating wattage and would not be included on the production unit.

In FIGS. 5, 6, 7, and 8; an alternate method for operating the high speed valve and port assembly 15 is illustrated. Referring to FIG. 5, A view taken in cutting plane 3—3 in FIG. 2; the flexible diaphram 8 is replaced by the high speed valve cam 69, and the high speed valve spring retainer 16 by the high speed valve cam follower 81. In addition, the upper housing 2 is modified to accommodate the cam and its linkage by adding a reenforcing boss around the high speed valve cam shaft 70 exit hole. The remaining componnents of the liquid fuel vaporizer-regulator are unchanged from that illustrated in FIGS. 1, 2, 3, and 4. The high speed valve cam 69, machined from metal or plastic with a collar and cam porfile as shown in FIG. 7, is attached to the high speed valve cam shaft 70 with the cam shaft roll pin 71. The high speed valve cam shaft 70 protrudes through the reenforcing boss, located on the upper housing 2, where the cam shaft lever and collar 72 is pinned to the cam shaft end with the cam shaft roll pin 71. The lever and collar are welded together transmitting torque loads from the control wire trunnion 73 to the high speed valve cam shaft 70. The trunnion screw 74 locks the cam control wire 78 into the control wire trunnion 73. In FIG. 6, the control wire trunnion 73 is pinned to the cam shaft lever and collar 72 with the trunnion roll pin 75. In FIG. 8, the control wire support bracket and clip 76 are attached by the housing interface screws 37 to the joint between the upper housing 2 and the lower housing 3. The control wire clamp 77, formed to enclose the control wire sheath 79, locks it to the support bracket and clip 76 with the support bracket and clip screws 80. The cam control wire 78 is thus supported by the control wire sheath 79, fixed at either end, and is free to displace along the sheath length. The cam control wire 78 far end, attached to the carburetor throttle linkage with suitable brackets and clamps at a convienient location, transmits throttle linkage motion to the control wire trunnion 73. The above described mechanism rotates the high speed valve cam 69 to displace the high speed cam follower 81, as indicated by the dashed line in FIG. 7. The high speed valve cam follower 81, machined from corrosion resistant metal to a circular profile and threaded to the high speed valve and port assembly 15, traps the high speed valve spring 17 between the retainer and the valve housing and port assembly 18 in the same manner as the high speed valve spring retainer 16. Mechanical operation of the high speed valve and port assembly 15 provides quicker response to carburetor throttle linkage displacement; but is more difficult to adapt with various engine and carburetor configurations than the diaphram operated high speed valve embodiment of this invention, illustrated in FIG. 1.

FIG. 9 illustrates the liquid fuel vaporizer-regulator installation and is very similar to a typical LPG vaporizer-regulator installation. The mounting U-bolt 82, radiused to the upper housing 2 diameter, and the mounting J-bolt 83, radiused to the lower housing 3 diameter; provides an adaptable fastener, which induces clamping forces through the housing saddle adapter 84, attaching the liquid fuel vaporizer-regulator to the housing mounting bracket 85. Due to the electrical switch location which prevents full access around the lower housing diameter, a J-bolt is used on the lower housing 3. The tank fuel return line 86 is connected between the liquid fuel vaporizer-regulator and the main fuel tank. The tank fuel supply line 87, modified by inserting the fuel line plumbing tee 94 on the carburetor fuel pump 93 outlet fitting, supplies fuel to the liquid fuel vaporizer-regulator and the existing engine liquid fuel carburetor. Each plumbing tee leg is attached through the fuel shut-off valve 88 to the liquid fuel carburetor 95 and the liquid fuel vaporizer-regulator. Consequently, fuel can be routed to either item providing a dual fuel mode operational capability. The fuel vapor hose 42 is attached, with two fuel vapor hose clamps 43, to the vaporizer-regulator fuel vapor outlet fitting 39 and the fuel vapor hose adapter fitting 90, which is attached to the fuel vapor control valve 89. The fuel vapor control valve 89 outlet fitting is attached to the carburetor annular nozzle 91, which is placed between the carburetor throat and the carburetor air cleaner and filter housing 92. These items; 42, 43, 89, 90, 91, and 92; are manufactured by the LPG vaporizer-regulator industry and may be purchased from commercial dealers in LPG hardware. It may be necessary to modify the air cleaner and filter housing 92 to warm cold incomming combustion air, to prevent the fuel vapor from precipitating as liquid droplets in the intake manifold. For newer automobiles, air warmers are part of the smog control system and will not require modification to the air cleaner and filter housing 92. But for older automobiles, air warming may be necessary and can be accomplished by installing the illustrated modification, consisting of an exhaust gas inlet line 96 attached to an exhaust gas four leg plumbing fitting 99 and an exhaust gas heater tube 100. The exhaust gas thermostat 98, attached to the plumbing fitting upper leg, controls the exhaust gas circulation flow in the heater tube 100 by leaking exhaust gas into the exhaust gas outlet line 97. At a 20 to 1 air to fuel ratio, the required estimated temperatures should be between 85° to 115° F. Carburetor inlet air temperature should be cold as possible for maximum volumetric efficiency.

The liquid fuel vaporizer-regulator operation for the diaphram operated high speed valve embodiment of this invention may be described with reference to FIGS. 1, 2, 3, 4, and 9. In FIG. 1, the low speed adjusting screw and spring 6, displaced approximately 0.063 inch, holds the low speed valve 12 open, permitting sufficient fuel vapor to escape through the fuel vapor outlet fitting 39 in the upper housing 2 to the liquid fuel carburetor 95, permitting engine idle speed operation. Once determined, this adjustment is permanent. To start the engine, the carburetor throttle is opened and the starter motor operated by closing the ignition key, which energizes the heating element 21 vaporizing sufficient fuel to start the engine. Pumping action of the engine pistons pulls additional air through the carburetor annular nozzel 91, causing a vacuum to draw fuel vapor from the chamber above the heating element housing 20 through the preset low speed valve 12 orifice. As engine speed increases by opening the carburetor throttle, the increased vacuum in the carburetor annular nozzel 91 induces a force on the flexible diaphram 8, which displaces the low speed valve 12 downward. The downward displacement continues until the low speed valve spring retainer 13 contacts the end of the high speed valve and port assembly 15. Flexible diaphram loads, transmitted to the high and low speed valves locked together, induces additional downward displacement opening the chamber, located between the high speed valve and port assembly 15 and the inner surface of the valve housing and port assembly 18, to the space above the heating element housing 20. The larger flow area thus exposed induces an increased flow of hot, dry fuel vapor into the upper housing 2 through the valve housing and port assembly 18. The additional fuel vapor, drawn into the carburetor, increases engine RPM to high speed operation. Engine response is smooth and uniform since the air-fuel mixture is transported without loss into the combustion chamber and instantly ignited. In contrast, liquid fuel would coat the intake manifold walls and cause a lag in engine operation requiring the use of an accelerator pump to make up fuel loss. As fuel vapor is drawn into the carburetor; liquid fuel, stored in the lower housing 3, is consummed lowering the liquid fuel level, indicated by the shaded lines in FIGS. 1 and 3. Referring to FIGS. 2 and 3, as the fuel level lowers; the inlet float 44, supported by fluid pressure against its interfacing surface with the liquid fuel, induces a downward force on the inlet float linkage 45, fixed to the inlet float. The inlet float linkage 45 rotates about the fulcrum point, attached to the float linkage support bracket 48, displacing the inlet valve plug 34 upward allowing fuel to enter the lower housing 3 through the inlet fitting 30. When the fluid level is restored to its operating depth, hydrostatic pressure forces fuel through the vapor chamber housing 19 lower end, filling the space between its inner surface and the heating element housing 20 outer surface. This narrow passageway limits the fuel flow contacting the heating element housing 20 hot end surface, which is heated by the heating element 21. When the engine is operating at a steady RPM, the fuel vapor is drawn off at a steady rate proportional to the carburetor throat vacuum. Consequently, if the engine RPM is suddenly dropped to idle speed; the flexible diaphram would return to its zero displacement position. The low speed valve 12 remains open at the flexible diaphram 8 zero position, due to the low speed adjusting screw and spring 6 initial displacement, maintaining engine idle speed. Since the low speed valve orifice is greatly restricted in flow area; surplus fuel vapor is trapped in the chamber above the heating element housing 20. The hot vapor, expanding with increasing pressure, forces the fluid contained in the chamber surrounding the heating element housing 20 through the vapor chamber housing 19 lower end into the lower housing 3, increasing fluid depth. The space above the liquid surface in the lower housing 3, vented to ambient air pressure through the fuel reservoir air vent 38, permits the fluid level to rise until the resulting hydrostatic pressure equals the hot fuel vapor pressure. As the fuel level rises, fluid pressure against the outlet float 46 rotates the outlet float linkage 47 about the fulcrum point, attached to the float linkage support bracket 48, causing the electric switch linkage 51 to displace downward. The electrical switch connecting pin 52 transmits the resulting downward lead to the electrical switch lever arm 53, rotating the electrical switch shaft 54, causing the contact point screws 57 to separate, terminating the electrical current to the heating element 21. The electrical switch operates before the outlet valve plug 33, attached to the outlet float 46 by the outlet valve plug linkage 35, clears the outlet fitting 29. As the fluid in the lower housing 3 reservoir drains through the outlet fitting 29 into the tank fuel return line 86 and back to the fuel tank, the fluid level returns to its normal depth. Due to the restoring torque applied to the electrical switch shaft 54 by the electrical switch shaft spring 55, the outlet valve plug 33 reseats in the outlet fitting 29, stopping fuel drainage. By this time, the surplus fuel vapor has been consumed and the system stabilizes at its normal idle speed operating condition. On hot summer days, fuel would boil first in the area around the hot heating element 21, repeating the above described operational cycle, circulating cold fuel in the reservoir and operating the heating element 21, providing optimum vaporizing temperatures. It is obvious that the vapor chamber housing 19 separates the fuel in the lower housing reservoir 3 from the fuel being vaporized in the chamber above the heating element housing 20. Consequently, only the specific fuel needed for engine operation is vaporized, when it is required, minimizing the size and electrical current requirements for the heating element 21.

Referring to FIGS. 5, 6, 7, and 8; the operation of the mechanical cam operated high speed valve embodiment of this invention is identical to the diaphram operated embodiment, except the high speed valve and port assembly 15 displacements are caused by the high speed valve cam 69 rotation against the high speed valve cam follower 81. After starting and idling the engine, the carburetor throttle linkage is displaced by depressing the accelerator petal. The cam control wire 78, which is attached to a convient location on the carburetor throttle linkage, is displaced due to the throttle linkage motion. The control wire sheath 79, which is fixed to brackets attached to the engine, supports the cam control wire 78 and prevents buckling. Throttle linkage load is thus transmitted to the control wire trunnion 73, which is pinned to the cam shaft lever and collar 72. The cam shaft lever and collar 72 rotates, transmitting torque through the cam shaft roll pins 71 to the high speed vlave cam 69, which is in contact with the high speed valve cam follower 81 surface. Since the carburetor linkage is spring loaded, a slight preload pressure maintains zero clearance between the contacting surfaces. Continued high speed valve cam 69 rotation displaces the high speed valve cam follower 81 downward, loading the high speed valve and port assembly 15. From this point, the operating cycle described for the diaphram operated high speed valve embodiment of this invention is repeated. The installation of the mechanical cam operated high speed valve embodiment of this invention is identical to the diaphram operated high speed valve embodiment, illustrated in FIG. 9, except the cam control wire 78 is attached to the carburetor throttle linkage. Due to the large number of engine, carburetor, and linkage configurations; a talored adapter bracket set would be required for each unique installation. Whereas, the diaphram operated high speed valve embodiment of this invention would easily adapt to either old or new engine-carburetor configurations. For either embodiment of this invention; the mounting U-bolt 82, the mounting J-bolt 83, and the housing saddle adapter 84 can be replaced by mounting lugs cast integrally into the upper and lower housings 2 and 3. However, this attachment mode would limit vaporizer-regulator orientation with respect to the carburetor location increasing installation problems for different engine-carburetor configurations.

A third embodiment of this invention, not illustrated in the drawings would involve replacing the liquid fuel carburetor 95 with a special carburetor-venturi body, designed specifically to utilize petroleum fuel vapor, constructed either as a separate unit or unitized with either the upper or lower housings 2 and 3. Such an embodiment of this invention would incorporate the carburetor annular nozzle 91 into the carburetor venturi. The fuel vapor control valve 89, attached to the cast manifold housing between the vaporizer-regulator and the venturi, would match fuel vapor flow to the maximum venturi air flow. In addition, the mounting U-bolt 82, the mounting J-bolt 83, the housing saddle adapter 84, and the housing mounting bracket 85 would be eliminated. Tooling costs for the unitized carburetor-venturi body are higher due to the numerous plumbing taps, required to operate the smog control devices and accessories, currently installed on modern automobiles. It would be economically feasible to utilize this embodiment on fuel systems designed for specific vehicles and for industrial engines, lacking accessories, that require a multi-fuel operational capability. A multi-fuel capability is difficult to achieve because some petroleum fuels are so viscous they cannot be utilized by an ordinary gasoline carburetor. However, after vaporization, the dry gas can be controlled by utilizing the vaporizer-regulator invention described above. An additional problem is pre-ignition detonation, also known as "knock," in the combustion chamber. This phenomenon is caused by high temperatures, induced by surplus fuel in the combustion chamber, and engine compression ratio. By accurately metering the specific fuel quantity required and reducing the compression ratio a few percent, these problems can be eliminated. Various liquid fuels contained in storage tanks, in accordance with cost and supply parameters, could then be consumed as required.

The embodiments of the liquid fuel vaporizer-regulator illustrated in the included drawings and described in the above text is to be considered illustrative of the invention concept. In the course of design and construction, variations from that which is specified above may occur and it is understood that no limitations be placed on these variations falling within the scope of this invention as claimed.

What is claimed is:

1. In a liquid fuel vaporizer-regulator device, a lower housing fuel reservoir chamber means, an upper housing expansion chamber means with an outlet fitting means to distribute fuel vapor to an engine, a smaller diameter vapor chamber duct means connecting the upper and lower housing means, hydrostatic pressure means suppling liquid fuel from the lower housing means into the vapor chamber duct means lower end, an electrically energized heating element and housing means placed inside the vapor chamber duct means lower end and immersed in the liquid fuel, a float operated inlet and outlet valve and linkage means placed around the vapor chamber duct means and controlling fluid level hydrostatic pressure means and the electrically energized heating element means operation, high and low speed valve means mounted in a valve housing means to regulate fuel vapor flow from the vapor chamber duct means upper end into the upper housing expansion chamber means, a flexible diaphram means to displace the high speed valve means and an adjusting screw means to displace the low speed valve means, providing fuel vapor to a carburetor means to operate an internal combustion engine.

2. The combination described in claim 1 with the addition of mounting lug means cast or machined into the upper and lower housing means.

3. The combination described in claim 1 with either the upper or lower housing means cast or machined integrally with a vapor-nozzel venturi and control valve means into an unitized housing assembly means.

4. In a liquid fuel vaporizer-regulator device, a lower housing fuel reservoir chamber means, an upper housing expansion chamber means with an outlet fitting means to distribute fuel vapor to an engine, a smaller diameter vapor chamber duct means connecting the upper and lower housing means, hydrostatic pressure means suppling liquid fuel from the lower housing means into the vapor chamber duct means lower end, an electrically energized heating element and housing means placed inside the vapor chamber duct means lower end and immersed in the liquid fuel, a float operated inlet and outlet valve and linkage means placed around the vapor chamber duct means and controlling fluid level hydrostatic pressure means and the electrically energized heating element means operation, high and low speed valve means mounted in a valve housing means to regulate fuel vapor flow from the vapor chamber duct means upper end into the upper housing expansion chamber means, a mechanical means to displace the high speed valve means and an adjusting screw means to displace the low speed valve means to operate an internal combustion engine.

5. The combination described in claim 4 with the addition of mounting lug means cast or machined into the upper and lower housing means.

6. The combination described in claim 4 with either the upper or lower housing means cast or machined integrally with a vapor-nozzel venturi and control valve means into an unitized housing assembly means.

* * * * *

UNITED STATES PATENT OFFICE
CERTIFICATE OF CORRECTION

Patent No. 4,092,963　　　　　　　　Dated June 6, 1978

Inventor(s) Richard A. Vrooman

It is certified that error appears in the above-identified patent and that said Letters Patent are hereby corrected as shown below:

Column 1, line 53, after "intake-exhaust" -- valve -- should be inserted.

Column 6, line 3, "in the" should read -- through a hole in the lower housing 3 side --.

Column 6, line 59, "porfile" should read -- profile --.

Column 9, line 30, "lead" should read -- load --.
　　　　　line 66, "petal" should read -- pedal --.

Column 10, line 8, "vlave" should read -- valve --.

Signed and Sealed this

Seventh Day of November 1978

[SEAL]

Attest:

RUTH C. MASON
*Attesting Officer*

DONALD W. BANNER
*Commissioner of Patents and Trademarks*